UNITED STATES PATENT OFFICE.

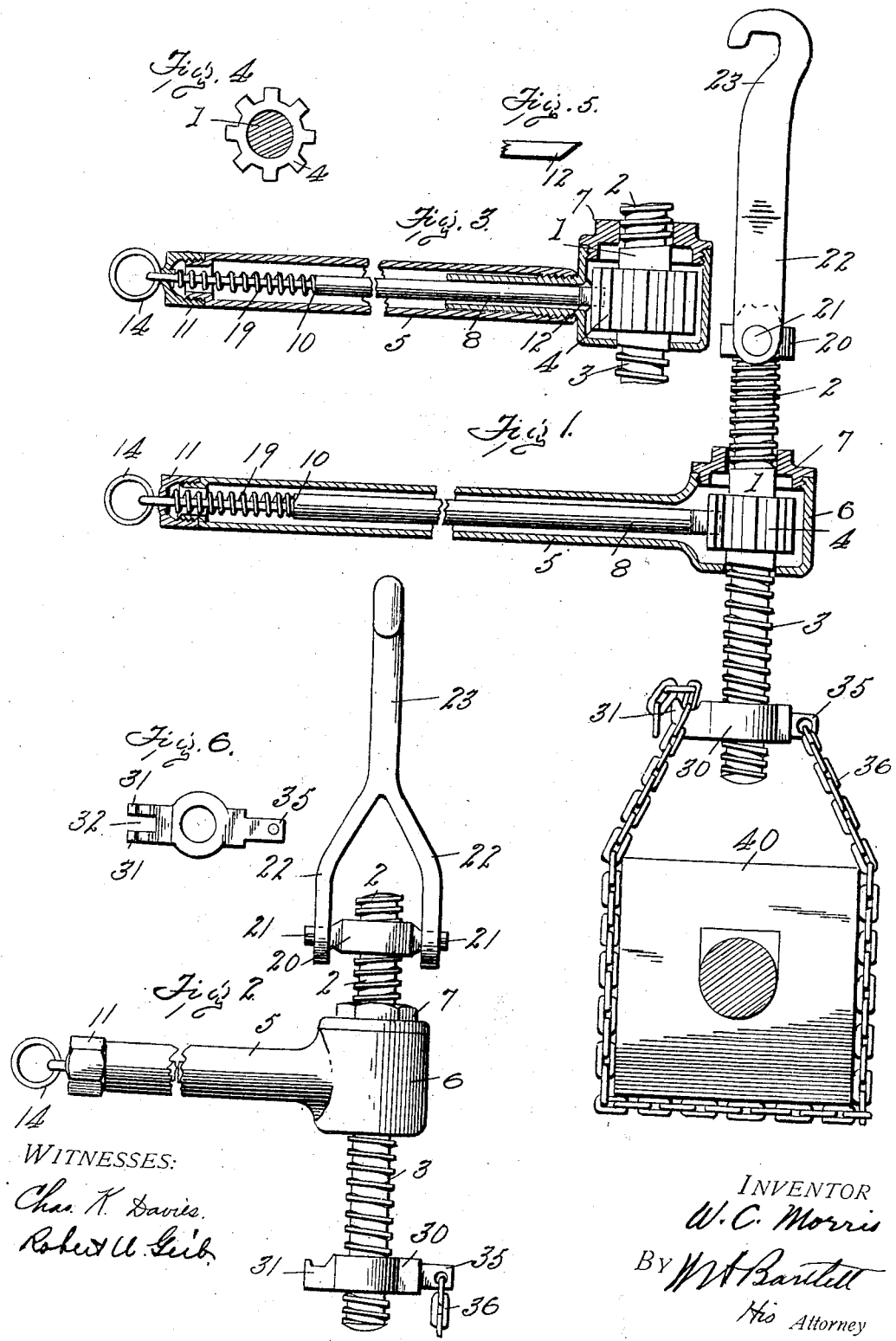

WILLIAM C. MORRIS, OF HOUSTON, TEXAS.

DOUBLE-SCREW SWIVEL LIFTING-JACK.

No. 810,374. Specification of Letters Patent. Patented Jan. 16, 1906.

Application filed November 8, 1904. Serial No. 231,961.

*To all whom it may concern:*

Be it known that I, WILLIAM C. MORRIS, a citizen of the United States, residing at Houston, in the county of Harris and State of Texas, have invented a new and useful Improvement in Screw-Jacks; and I do hereby declare that the following is a full, clear, and exact description thereof, reference being had to the drawings making part hereof.

The object of the invention is to produce a lifting-jack for various purposes.

The invention consists in the construction and combination of mechanical elements, as hereinafter described and claimed.

Figure 1 is a partial vertical section and partial elevation of the jack as applied to the lifting of a weight, as a box and axle. Fig. 2 is a broken side elevation of the jack, parts being omitted from the showing of Fig. 1 and parts being in different position. Fig. 3 is a broken section showing a slight modification from what is shown in Fig. 1. Fig. 4 is a section of screw-shaft and plan of ratchet-wheel. Fig. 5 is a broken plan of the pawl which engages the ratchet. Fig. 6 is a plan of the chain-supporting nut.

The numeral 1 indicates a rod or shaft provided with a screw-thread 2 at its upper end and a thread 3 of reverse pitch at its lower end. A ratchet-wheel 4 is rigidly connected to shaft 1 between the threaded sections 2 and 3. A handle or hollow bar 5 has a box 6, which incloses wheel 4, a removable cap 7 permitting the application of the box and handle to the screw-shaft. The screw-shaft passes easily through openings in the upper and lower part of the box—that is, the box and cover. The box thus becomes a housing for the ratchet 4.

The handle 5 contains a pawl 8, which is pressed in toward the ratchet 4 by a spring 9, which bears on a shoulder 10 on the pawl and on a cap 11 at the outer end of the handle. One face of the pawl is beveled near the end of the pawl, as indicated at 12. The pawl can be drawn out from the ratchet by a pull on ring 14, and the pawl can then be turned so as to have its beveled face directed in the opposite direction. The beveled face will ride over the teeth of the pawl in one direction. By means of the ratchet-and-pawl connection the handle 5 may be used as a lever to rotate the pawl 4, and with it the screw-shaft 1, to which said pawl is rigidly attached.

The threaded portion 2 of shaft 1 passes through a nut 20, and when the shaft is rotated the thread screws up or down in said nut 20, according to the direction of rotation of the shaft. Nut 20 has pintles 21 21, one pintle at each end. These pintles enter bearings in the arms 22 of a hook 23. Hook 23 can therefore swing on the pintles 21, and the nut 20 may assume an angular relation with reference to the hook 23. Thus the nut 20 may be suspended by the hook in such position that the shaft 1 may move vertically in the nut, although the hook 23 may hang at an inclination, or vice versa.

The threaded portion 3 of shaft 1 passes through a nut 30. Said nut 30 has a two-pronged hook 31 at one end, which hook, as shown, is divided into two prongs by an opening 32. This permits the engagement of hook 31 with any link of a chain, as one link may be passed between the two prongs 31 of the hook, leaving the next link to bear on both prongs, or a link may be passed over one or both prongs.

A perforated lug 35 on nut 30 has a chain 36 attached thereto. Chain 36 may be passed round any weight or object to be lifted, as 40, and the hook 23 suspended from any suitable fixed point of support. Then if the weight 40 be prevented from rotation and shaft 1 rotated the weight will be lifted by each rotation of shaft 1 as rapidly as the sum of the pitch of the screw-threads 2 and 3 in each turn. On the other hand, if weight 40 be permitted to turn with shaft 1 the screw 2 becomes the only effective means of lifting, and the weight is raised with less speed but more power.

It will readily be understood that a different handle or lever might be used to rotate the screw-shaft without changing the general principles of the invention.

What I claim is—

1. In a lifting-jack, and in combination, a rod or shaft having a ratchet-wheel rigidly attached at its center, and having screw-threads of opposite pitch toward its ends, a hollow handle consisting of a box portion inclosing said ratchet-wheel and pawl and a handle portion, and a rod extending to the end of the handle, by which said pawl may be operated, and a nut at each end of the shaft, having threads corresponding with the threads of the shaft, each nut having means for attachment to external bodies.

2. In a lifting-jack, the combination of a screw-shaft having a fixed ratchet on its central portion and screw-threads of opposite pitch in the direction of its ends, a hollow handle having a box portion surrounding said ratchet, said box having a threaded cover and surrounding the ratchet-wheel, a spring-pressed pawl in the hollow handle and box and extending to the end of said handle, said pawl engaging said ratchet-wheel, and nuts with threads of opposite pitch at the opposite ends of said screw-shaft, each nut provided with means for attachment to an outside body.

Witness my hand at Houston, Texas, this 19th day of October, 1904.

WILLIAM C. MORRIS.

Attest:
C. L. BRADLEY,
E. F. BARNHILL.